(No Model.)
W. H. DAVIS.
INSULATOR FOR ELECTRIC CONDUCTORS.
No. 296,146. Patented Apr. 1, 1884.
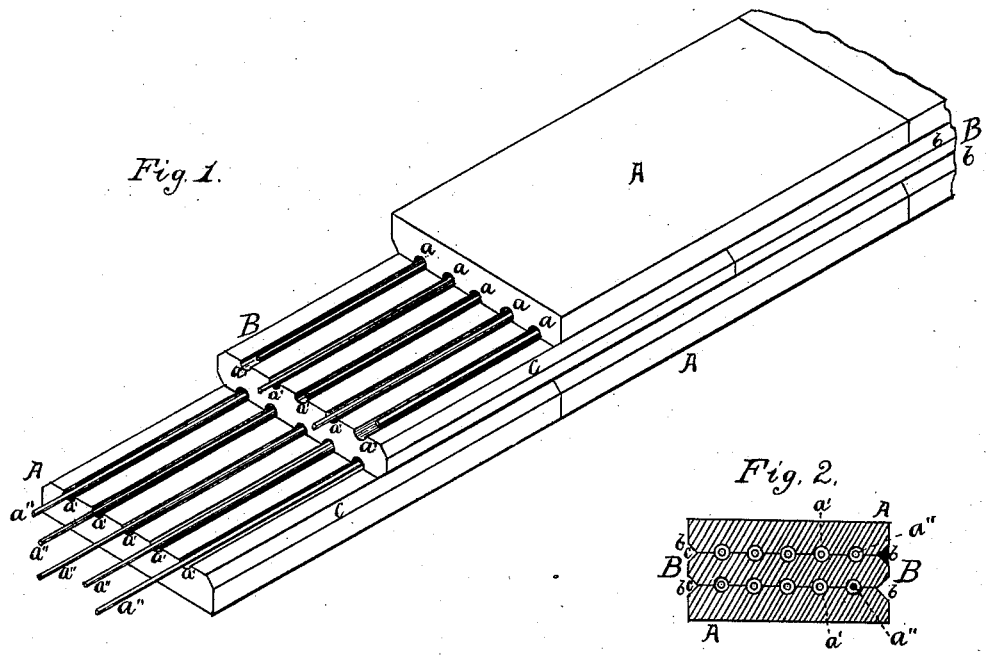
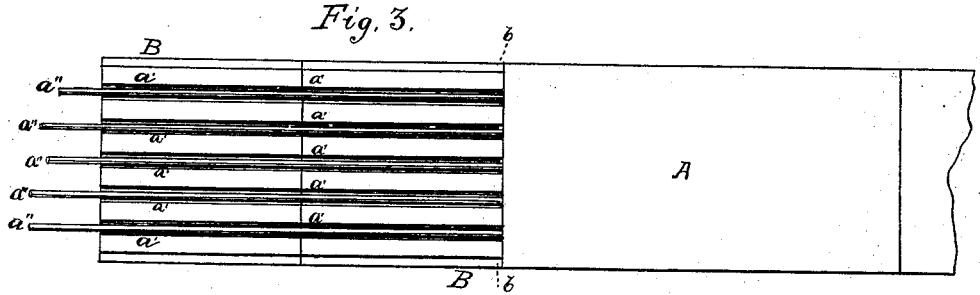
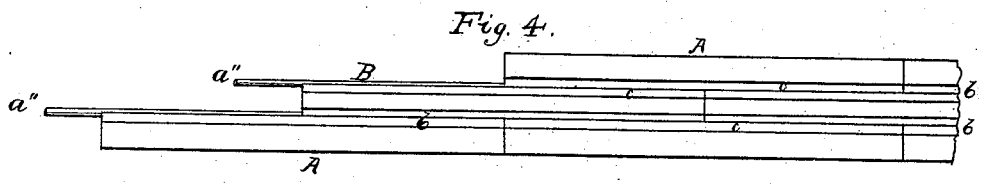
Witnesses:
Geo. W. Bullard.
S. A. Bullard
Inventor:
Wm. Hope Davis

UNITED STATES PATENT OFFICE.

WILLIAM HOPE DAVIS, OF SPRINGFIELD, ILLINOIS.

INSULATOR FOR ELECTRIC CONDUCTORS.

SPECIFICATION forming part of Letters Patent No. 296,146, dated April 1, 1884.

Application filed May 5, 1883. (No model.)

*To all whom it may concern:*

Be it known that I, WILLIAM HOPE DAVIS, of Springfield, in the county of Sangamon and State of Illinois, have invented certain new and useful Improvements in Insulators for Electric-Wire Conductors; and I do hereby declare the following to be a full and clear and exact description of the invention, such as will enable others skilled in the art to which it pertains to make and use the same.

My invention relates to an improvement in insulators for electric-wire conductors.

The object of my invention is to provide a cheap, efficient, and durable insulator for electric-wire conductors, by which a single wire conductor or any number of wire conductors of electricity can be placed in close proximity to each other and securely laid in the earth, or under water, or on the surface of the earth, on the top of buildings, in walls, or on or in any suitable support; and with these ends in view my invention consists in certain details of construction and combinations of parts, as will be more fully described and set forth.

In the accompanying drawings, Figure 1 is a perspective view, showing my improved insulator, giving the two forms of the plates of which it is constructed, the manner in which they are laid together, and the canals or passages in which the wires are laid, and the wires as laid in the insulator. Fig. 2 is a sectional end view of the insulator, showing, in addition to the perspective view, the grooves at or in the sides of the insulator formed along the joints of the plates by the beveled edges of the plates. Fig. 3 is an elevated top view of the insulator. Fig. 4 is a side view of the same, showing the grooves along the joints of the plates.

A represents the upper and lower or top and bottom plates of the insulator.

B shows the intermediate plates. The plate B is made any length and width and thickness desired, with the grooves shown at or by $a'$ of any number and any size desired, parallel to each other and on both sides of the plate, and with the corners shown at or by $c$ beveled to any angle and depth desired. The plate A is made like the plate B, except that one side of the plate A is without the grooves $a'$ or the beveled corners $c$, but is made plain. The plates B and A are made of potter's clay or any other suitable clay or earthy substance, so manufactured and burned as to be hard and glazed like crockery and earthen ware and impervious to water and moisture. The bottom plates, A, are laid in a bed of cement or any plastic material that will shut out water and moisture, so that the grooves $a'$ of all the plates register with and are in a line with each other. When the wires have been laid or placed in the groove $a'$ of the bottom plates, and it is desired to lay another layer or layers of wires, the intermediate plate, B, is laid upon the plates already down, with wires in position so as to break joints, as shown by Fig. 1, and then wires placed in the grooves $a'$ on the upper side of the last layer of the intermediate plates, B, and so on until the number of layers of wires above each other that may be desired are laid; but when the last layer of wires is laid, the top layer of wires is covered with the plate A, as shown in Fig. 1. The grooves shown at or by $b$, formed by the beveled corners $c$, are then thoroughly filled with cement or any other plastic material that will prevent water or moisture from entering, and the joints where the ends of the plates meet are protected from water and moisture by being thoroughly plastered with the same material as that used in the grooves $b$.

The plates A and B may be made of any material that is a non-conductor of electricity and that is impervious to water and moisture.

It is evident that slight changes in the construction and laying the plates A and B of my invention may be resorted to without departing from the spirit of my invention, and here I would have it understood that I do not limit myself to the exact construction of these plates and the parts shown and described, nor to the exact method of laying them as shown and described, but consider myself at liberty to make such changes as come within the spirit and scope of my invention.

Having fully described my invention, what I claim as new, and desire to secure by Letters Patent, is—

1. In an insulator of the character described, the impermeable and non-conducting plates A A, grooved upon their meeting surfaces, and each beveled upon one edge of its outer ends to form a V-shaped groove at the junction of the two plates for the reception of cement or other plastic material, by which said plates are secured together independently of other means, substantially as set forth.

2. In an insulator of the character described, the combination, with the grooved and beveled plates A A, of the intermediate plate, B, grooved upon its upper and lower surfaces, and beveled upon both edges of its outer ends to form two V-shaped grooves at the junction of the three plates, for the reception of cement or other plastic material, by which said plates are secured together independently of other means, substantially as set forth.

In testimony whereof I have signed this specification in the presence of two subscribing witnesses.

WILLIAM HOPE DAVIS.

Witnesses:
K. B. DAVIS,
JEROME M. STUART.